United States Patent [19]

Beecken

[11] 4,046,771
[45] Sept. 6, 1977

[54] STYRYL DYESTUFFS

[75] Inventor: Hermann Beecken, Leverkusen, Germany

[73] Assignee: Bayer Aktiengesellschaft, Leverkusen, Germany

[21] Appl. No.: 617,142

[22] Filed: Sept. 26, 1975

[30] Foreign Application Priority Data

Oct. 3, 1974 Germany ............... 2447229

[51] Int. Cl.² .......................................... C07D 263/56
[52] U.S. Cl. ................... 260/307 D; 8/1 B; 8/165; 260/287 T; 260/302 F; 260/283 CN; 544/105
[58] Field of Search ............. 260/307 D, 283 CN

[56] References Cited

U.S. PATENT DOCUMENTS

| 3,784,558 | 1/1974 | Peter et al. | 260/307 D |
| 3,920,720 | 11/1975 | Beechen | 260/307 D |

Primary Examiner—Donald G. Daus
Assistant Examiner—Mary C. Vaughn
Attorney, Agent, or Firm—Plumley & Tyner

[57] ABSTRACT

The invention relates to water-insoluble styryl dyestuffs of the formula

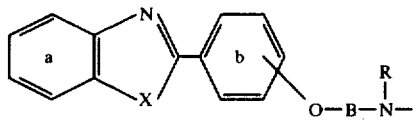
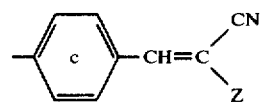

in which
X is an O- or S-atom,
B is an alkylene group,
R is a hydrogen atom, an alkyl or aryl or the remaining members of ring system which is fused to the ring c,
Z is a cyano group or a carboxylic acid ester.

The dyestuffs are outstanding suitable for the dyeing of synthetic fibre materials which are dyed in greenish-yellow shades with good fastness properties, especially good resistance to hydrolysis.

4 Claims, No Drawings

STYRYL DYESTUFFS

The present invention relates to practically water-insoluble dyestuffs of the formula

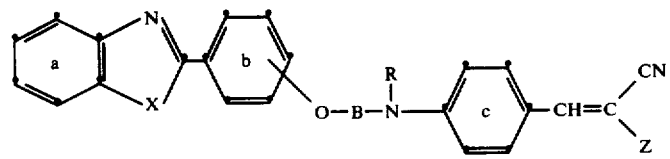

(I)

wherein
X represents an O- or S-atom,
B represents an alkylene group,
R represents hydrogen, alkyl, aryl or the remaining members of a partially saturated 5-membered or 6-membered ring which is fused to the ring c,
Z denotes a cyano grouping or a carboxylic acid ester grouping $CO_2V$
in which
V denotes an alkyl, alkenyl, cycloalkyl or aralkyl radical.
and wherein
the rings a, b and c and the alkyl, alkenyl, cycloalkyl, aryl and alkylene groups mentioned, and ring members of the heterocyclic structure optionally fused to the ring c, can contain further non-ionic substituents, as well as to their preparation and their use for dyeing and printing synthetic fibre materials and for bulk dyeing of thermoplastics.

Non-ionic substituents in the sense of the invention are substituents customary in styryl dyestuff chemistry, which do not confer solubility in water in a neutral to acid pH range, such as, for example, $C_1$- to $C_8$-alkyl, $C_1$- to $C_8$- alkoxy, $C_1$- to $C_8$-alkylmercapto, $C_5$- to $C_8$-cycloalkyl which is optionally substituted by lower alkyl and/or bonded to lower alkyl, $C_3$- to $C_8$-alkenyl, $C_3$- to $C_8$-alkenyloxy, $C_5$- to $C_8$-cycloalkoxy, $C_3$- to $C_8$-alkenylmercapto, $C_5$- to $C_8$-cycloalkylmercapto, optionally lower alkyl-substituted and/or lower alkoxy-substituted and/or halogen-substituted phenyl, phenoxy, phenylmercapto or phenyl-$C_1$- to -$C_4$-alkyl, halogens, carboxylic acid lower alkyl ester radicals, cyano radicals, $C_1$- to $C_5$-alkylcarbonyl radicals and benzoyl radicals.

Lower alkyl represents $C_1$- to $C_4$-alkyl radicals which can optionally have non-ionic substituents; preferred substituents in this context are Cl, CN and $C_1$- to $C_2$-alkoxy.

Suitable aryl radicals are phenyl and naphthyl radicals which can optionally be monosubstituted, disubstituted or trisubstituted by halogen, $C_1$- to $C_4$-alkyl, $C_1$- to $C_4$-alkoxy, $C_1$- to $C_4$-alkylmercapto, benzyl, cyclohexyl or cyclopentyl. Preferred aryl radicals are optionally substituted phenyl radicals.

Preferred cycloalkyl radicals are cyclopentyl and cyclohexyl which can in turn be monosubstituted, disubstituted or trisubstituted by methyl or ethyl.

Suitable aralkyl radicals are, in particular, benzyl, phenethyl and phenpropyl, or which the phenyl radical is optionally monosubstituted, disubstituted or trisubstituted by halogen, lower alkyl or alkoxy.

Suitable alkenyl radicals are allyl and butenyl.

Within the scope of the present invention, halogen denotes fluorine and bromine and especially chlorine.

Suitable alkylene groups B in the sense of the invention are non-chromophoric members, preferably $C_2$- to $C_5$-alkylene chains which are optionally interrupted by an oxygen or sulphur atom and which can also be branched and/or substituted by a $C_1$- to $C_4$-alkoxy or $C_3$- to $C_5$-alkenyloxy group, a benzyloxy group or a phenoxy group.

A group of preferred dyestuffs according to the invention has the formula

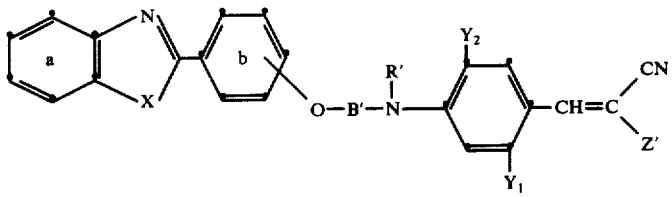

(II)

wherein
X, a and b have the meaning indicated under formula (I) and
B' represents —$C_2H_4$—, —$C_3H_6$—, —$C_4H_8$—, —$CH(CH_3)CH_2$—, —$CH(C_6H_5)CH_2$—, —$CH(CH_2OCH_3)CH_2$—, —$CH(CH_2OC_2H_5)CH_2$—, —$CH(CH_2OCH_2CH=CH_2)CH_2$—, —$CH(CH_2OC_6H_5)CH_2$— or —$CH(CH_2OCH_2C_6H_5)CH_2$—,
R' represents hydrogen, $CH_3$, $C_2H_5$, $C_3H_7$, $C_4H_9$, $CH_2C_6H_5$, $C_2H_4OCH_3$, $C_2H_4OC_2H_5$, $C_2H_4CN$, $C_2H_4C_6H_5$, $CH_2CH(C_6H_5)CH_3$ or $(CH_2)_3C_6H_5$,
$Y_1$ represents hydrogen, $C_1$- to $C_4$-alkyl, $C_1$- to $C_4$-alkoxy, $CF_3$, phenoxy, F, Cl or Br,
$Y_2$ represents hydrogen, $C_1$- to $C_4$-alkyl, $C_1$- to $C_4$-alkoxy, chlorine or bromine and $C_4$-alkoxy, chlorine or bromine and
Z' represents CN or a COO—$C_1$- to -$C_4$-alkyl which is optionally substituted by $OCH_3$, $OC_2H_5$, Cl, CN or phenyl.

A further group of preferred dyestuffs in the sense of the invention are those of the formula (II), wherein R' and $Y_2$ conjointly form the missing members of the optionally methyl-, ethyl- or chlorine-substituted partially saturated heterocyclic structure of an indoline, 1,2,3,4-tetrahydroquinoline, 2,3-dihydrobenzoxazine-(1,4) or 2,3,4,5-tetrahydrobenzazepine ring system.

Particularly preferred dyestuffs in the sense of the invention correspond to the formula

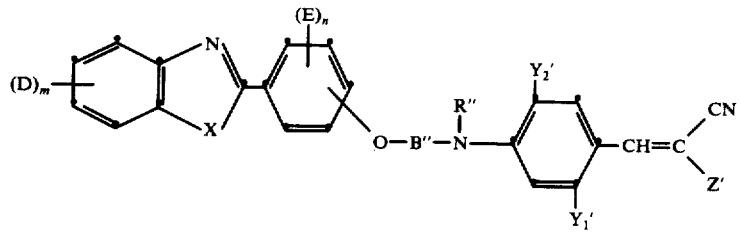

III wherein

X and Z' have the abovementioned meaning and

D and E independently of one another represent $C_1$- to $C_4$-alkyl, $C_1$- to $C_4$-alkoxy, trifluoromethyl, chlorine or bromine and D additionally represents phenyl, cyclopentyl or cyclohexyl, m and n independently of one another represent 0 to 4, B" represents $C_2H_4$, —CH(CH$_3$)CH$_2$—, —CH(CH$_2$OCH$_3$)CH$_2$— or —CH(C$_6$H$_5$)CH$_2$—, R" represents hydrogen or optionally methoxy-, ethoxy-, cyano- or phenyl-substituted $C_1$- to $C_4$-alkyl, $Y_1'$ represents hydrogen, $C_1$- to $C_4$-alkyl, trifluoromethyl, $C_1$- to $C_4$-alkoxy or chlorine, $Y_2'$ represents hydrogen, $C_1$- to $C_4$-alkyl, $C_1$- to $C_4$-alkoxy or chlorine, or R" + $Y_2'$ conjointly form the missing members of the optionally methyl-, ethyl-, propyl- and/or chlorine-substituted partially saturated heterocyclic structure of an indoline, 1,2,3,4-tetrahydroquinoline, 2,3-dihydrobenzoxazine-(1,4) or 2,3,4,5-tetrahydrobenzazepine ring system.

Very particularly valuable dyestuffs according to the invention fall under the general formula

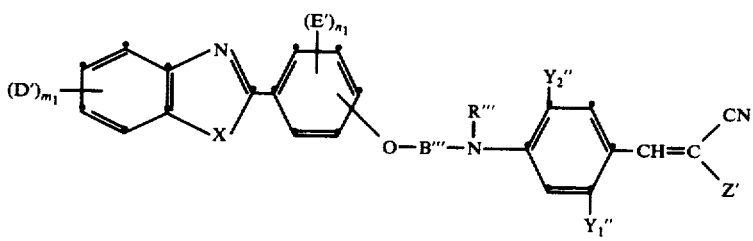

wherein

X and Z' have the abovementioned meaning and D' denotes hydrogen, chlorine, methyl, ethyl, propyl, methoxy, ethoxy, phenyl, benzyl or cyclohexyl, E' denotes hydrogen, chlorine, methyl, ethyl, propyl, methoxy or ethoxy, $m_1$ and $n_1$ each denote 0 to 2, B''' denotes —C$_2$H$_4$— or —CH(CH$_3$)CH$_2$—, $Y_1''$ denotes hydrogen, methyl, ethyl, methoxy, ethoxy or chlorine, $Y_2''$ denotes hydrogen, methyl, methoxy or ethoxy, and R''' denotes hydrogen, methyl or ethyl or R''' + $Y_2''$ conjointly represent the ring elements —CH(CH$_3$)CH$_2$—CH$_2$—, —C(CH$_3$)$_2$—CH$_2$—CH(CH$_3$)—, —C(CH$_3$)$_2$—CHCl—CH(CH$_3$)—, —CH(i-C$_3$H$_7$)CH$_2$—CH$_2$—, —CH(C$_2$H$_5$)CH$_2$—CH$_2$— or —CH(CH$_3$)CH$_2$—O— of a tetrahydroquinoline or benzmorpholine system.

In the abovementioned formulae, Z and Z' preferably represent CN.

The new dyestuffs according to the invention are prepared in a manner which is in itself known, by reacting aldehydes of the formula

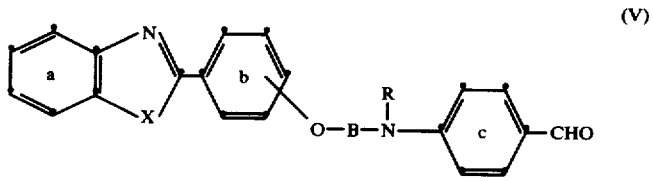

(V)

wherein

X, B, R, a, b and c have the meaning indicated under formula (I)

or their functional derivatives, such as, for example, azomethines, with methylene-active compounds of the formula

(IV)

wherein

Z can have the meanings indicated under formula (I).

The reactions are carried out at temperatures between 20° and 160° C, preferably in the temperature range of 50° to 120° C, in the melt or, in most cases, in a solvent which is inert under the reaction conditions. Examples of suitable solvents which may be mentioned are lower aliphatic alcohols with 1 to 4 carbon atoms, especially methanol, ethanol, the propanols and butanols, as well as benzene, toluene, xylene, chlorobenzene, dichlorobenzenes, chloroform, dimethylformamide, dimethylsulphoxide and acetonitrile. To accelerate the reaction, it is possible to add the basic catalysts customary for the Knoevenagel reaction, such as, for example, ammonia, diethylamine, triethylamine, piperidine, morpholine, N-ethylpiperidine, N-methylmorpholine, basic ion exchange resins, alkali metal hydroxides, alkai metal alcoholates, alkali metal carbonates, alkali metal acetates, acetates of ammonia and acetates of organic bases, such as, for example, ammonium acetate or piperidine acetate. The reaction can however also be carried out successfully in the presence of acetic acid and even in glacial acetic acid as the solvent.

It is also possible, with advantage, to dispense with the customary isolation of the aldehydes (V), which in most cases entails considerable losses, and to use these aldehydes, after decomposition of excess Vilsmeier reagent by lower aliphatic alcohols and adjustment of the pH value to about 6.5 - 8.5, directly for condensations with the methyleneactive components (VI). For this purpose, the presence of an emulsifying additive, for example of oxethylation products of higher alcohols or substituted phenols, can be useful, especially if aqueous alkali or aqueous ammonia are used to adjust the pH (compare German Offenlegungsschrift) German Published Specification No. 2,308,706.

Examples of suitable methylene-active compounds (VI) are malonic acid dinitrile, cyanoacetic acid methyl ester, cyanoacetic acid ethyl ester, cyanoacetic acid propyl ester, eyanoacetic acid butyl ester, cyanoacetic acid cyclohexyl ester, cyanoacetic acid γ-methoxypropyl ester, cyanoacetic acid cyanoethyl ester, cyanoacetic acid β-chloroethyl ester, cyanoacetic acid β-acetoxyethyl ester, cyanoacetic acid benzyl ester, cyanoacetic acid 4-chlorobenzyl ester, cyanoacetic acid 3,4-dichlorobenzyl ester, cyanoacetic acid 2,4,6-trichlorobenzyl ester, cyanoacetic acid β-phenoxyethyl ester, cyanoacetic acid β-(4-chlorophenoxy)-ethyl ester, cyanoacetic acid β-(4-methylphenoxy)-ethyl ester, cyanoacetic acid β-(4-tert.-butylphenoxy)-ethyl ester, cyanoacetic acid β-(4-cyclohexylphenoxy)-ethyl ester, cyanoacetic acid γ-phenoxypropyl ester, cyanoacetic acid β-phenylethyl ester, cyanoacetic acid γ-phenylpropyl ester, cyanoacetic acid β-phenylallyl ester and cyanoacetic acid α-naphthylmethyl ester.

To prepare the aldehydes (V), it is most advantageous to start from bases of the formula

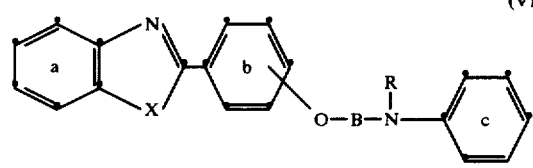

(VIII)

wherein

X, B, R, a, b and c have the abovementioned meaning.

These bases are reacted, in a manner which is in itself known, with so-called Vilsmeier reagents, that is to say with mixtures of N-formyl compounds

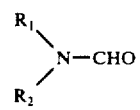

and inorganic acid halides, preferably phosphorus oxychloride, thionyl chloride or phosgene, or are formylated by the method of Duff (Journal of the Chemical Society [London] 1952, pages 1,159 to 1,164), advantageously in accordance with the variant in German Patent Specification No. 1,206,879.

Suitable aldimines of (V) are obtained, for example, in accordance with the instructions in U.S. Pat. Spec. No. 2,583,551 (Example 17).

The methods known from the literature for the preparation of N-alkoxyalkyl-anilines and N-aryloxyalkylanilines are suitable for the preparation of the bases (VII) and amongst these methods above all the reaction of N-halogenoalkyl-anilines, N-halogenoalkyl-indolines, N-halogenoalkyl-tetrahydroquinolines and N-halogenoalkyl-benzomorpholines with phenols of the formula

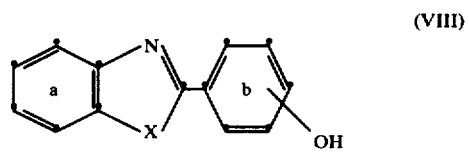

(VIII)

in the presence of customary hydrogen halide acceptors, such such as, for example, alkali metal hydroxides, or with the corresponding alkali metal phenolates in the melt or in solvents which are inert under the reaction conditions (aliphatic $C_1$- to $C_5$-alcohols, benzene, toluene, chlorobenzene, ethylene glycol monoethyl ether or monomethyl ether, dimethylformamide, N-methylpyrrolidone and others) at temperatures of up to about 140° C, preferably at 50° to 100° C.

Suitable aldehydes (V) can also be prepared in a different sequence, by reacting the phenolates with alreadly formylated N-halogenoalkyl compounds (IX) in accordance with

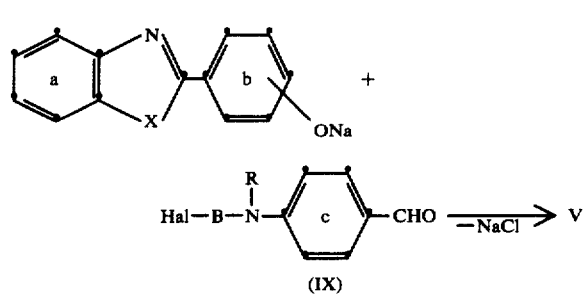

(IX)

wherein

Hal denotes bromine or preferably chlorine. This reaction is also in itself known (compare Example 1 of U.S. Pat. Spec. No. 3,635,957). The reactions are carried out in the melt or in organic solvents which are inert under the reaction conditions. They take place slowly even at room temperature but are suitably carried out at elevated temperatures, preferably in the range from 50° to 150° C. Examples of suitable solvents are lower alcohols, such as methanol, ethanol, propanols, or amyl alcohols, and also toluene, xylene, dimethylformamide and N-methylpyrrolidone.

A further method of preparation of the bases (VII) is the reaction of halogenoalkyl ethers (X) with secondary bases (XI) in a manner which is in itself known, in accordance with the following equation:

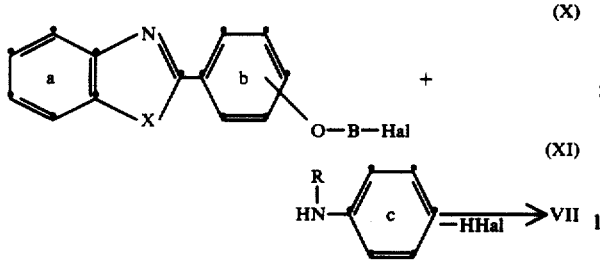

$$\text{(XI)}$$

The reaction takes place in solvents which are inert under the reaction conditions, such as, for example, toluene, xylene, chlorobenzene and dichlorobenzene, dimethylformamide, N-methylpyrrolidine or amyl alcohol, in the presence of customary hydrogen halide acceptors, at preferably 120° to 160° C. It is advantageous to carry out the reaction in excess secondary base (XI) as the solvent and HHal acceptor, in the stated temperature range.

Suitable benzoxazolylphenols and benzthiazolylphenols and for the preparation of (VII), if appropriate via (X), and for the direct reaction with (IX) to give (V), are known from the literature or accessible according to processes known from the literature, for example by cyclising condensation of 2-aminophenols or 2-aminothiophenols with the isomeric phenolcarboxylic acids or their derivatives, and in special cases by converting aniline compounds of the type of dehydro-thio-p-toluidine into phenols. The following, which can do no more than indicate the multiplicity of possibilities, may be mentioned as examples: from the benzoxazole series, 2-(4'-hydroxyphenyl)-, 2-(3'-hydroxyphenyl)-, 2-(4'-hydroxyphenyl)-5-methyl-, 2-(3'-hydroxyphenyl)-5-methyl-, 2-(4'-hydroxyphenyl)-5-chloro-, 2-(3'-hydroxyphenyl)-5,7-dichloro-, 2-(4'-hydroxyphenyl)-5,7-dichloro-, 2-(4'-hydroxyphenyl)-5-ethyl-, 2-(4'-hydroxyphenyl)-5-phenyl-, 2-(3'-hydroxyphenyl)-5-ethyl-, 2-(3'-hydroxyphenyl)-5-phenyl-, 2-(3'-hydroxyphenyl)-5-butoxy-, 2-(3'-hydroxyphenyl)-5-cyclohexyl-, 2-(4'-hydroxy-3'-chlorophenyl)-, 2-(4'-hydroxy-3',5'-dichloro)-, 2-(3'-hydroxyphenyl-4,5,7-trichloro- or 2-(3'-hydroxyphenyl)-5,7-dimethyl-benzoxazole- and from the benzthiazole series 2-(4'-hydroxyphenyl)-6-methyl-, 2-(4'-hydroxy-3'-methylphenyl)-4,6-dimethyl-, 2-(3'-hydroxyphenyl)-6-methyl-, 2-(3'-hydroxyphenyl)-4-methyl-6-chloro-, 2-(3'-hydroxyphenyl)-6-ethoxy- and 2-(4'-hydroxyphenyl)-6-tert.butyl-benzthiazole.

Examples of suitable secondary bases (XI) for the preparation of the bases (VII) and, if appropriate, of the N-halogenoalkyl precursors are N-methyl-aniline, N-methyl-m-toluidine, N-methyl-m-chloroaniline, N-methyl-m-anisidine, N-ethyl-2,5-dimethoxy-aniline, N-methyl-m-phenetidine, N-methyl-2,5-diethoxy-aniline, N-ethyl-aniline, N-propylaniline, N-n-butyl-aniline, N-benzyl-aniline, N-phenethylaniline, N-β-phenylpropyl-aniline, N-β-phenylpropyl-aniline, N-ethyl-m-toluidine, N-propyl-m-toluidine, N-n-butyl-m-toluidine, N-benzyl-m-toluidine, N-α-phenylethyl-m-toluidine, N-β-phenylethyl-m-toluidine, N-β-phenylpropyl-m-toluidine, N-β-phenylpropyl-m-toluidine, N-cyanoethyl-aniline, N-methoxyethyl-m-toluidine, N-ethyl-m-phenoxy-aniline, N-ethyl-m-anisidine, N-ethyl-m-phenetidine, N-ethyl-m-chloroaniline, N-ethyl-o-toluidine, N-ethyl-3-bromoaniline, N-methyl-2-ethylaniline, N-methyl-2-isopropylaniline, N-methyl-2,5-dimethylaniline, N-methyl-2-methoxy-5-methylaniline, N-butyl-3-chloroaniline, N-cyclohexylaniline, N-cyclopentyl-m-toluidine, N-methyl-2,5-dichloroaniline, N-methyl-3-propionylaminoaniline, N-benzyl-m-anisidine, N-propyl-3-trifluoromethylaniline, N-ethyl-3-acetamino-aniline, N-cyanoethyl-m-toluidine, 2-methyl-, 2-etyyl-, 2-methyl-6-chloro-, 2,5-dimethyl-, 2,3,3,-trimethyl-, 2,3,3,6-tetramethyl-, 2,3,3,-trimethyl-6-chloro-, 2,3,3,-trimethyl-6-methoxy- and 2,3,3,7-tetramethyl-2,3-dihydroindole, 2-methyl-, 2,7-dimethyl-, 2,2,4-trimethyl-, 2-methyl-7-methoxy-, 2-methyl-7-chloro-, 2-methyl-7-bromo-, 2-methyl-7-acetamino-, 2-methyl-7-phenyl-, 2,2,4-trimethyl-7-methoxy-, 2,2,4-trimethyl-7-bromo, 2,2,4-trimethyl-7-chloro-, 2,2,4-trimethyl-7-trifluoromethyl-, 2-ethyl-7-methyl-, 2-n-butyl-7-methyl- and 2-i-propyl-7-methyl-1,2,3,4-tetrahydroquinoline, 3,6-dimethyl-, 2,3-tetramethyl-, 2,2,3-trimethyl-6-methoxy-, 2,2,3-trimethyl-6-chloro-, 2,2,3-trimethyl-6-acetamino- and 3-ethyl-6-methyl-2,3-dihydrobenzoxazine-(1,4), and 3,3-tetramethylene-2-methyl-, 3,3-pentamethylene-2-methyl-, 3,3-tetramethylene-2,6-dimethyl-, 3,3-pentamethylene-2,6-dimethyl-, 2,3-trimethylene-6-methyl-, 2,3-tetramethylene- and 2,3-tetramethylene-6-methyl-2,3-dihydroindole.

If the N-hydroxyalkyl derivatives of the abovementioned secondary bases (XI) are reacted by the Vilsmeier method, for example with dimethylformamide and phosphorus oxychloride, they give, in a known manner, the corresponding N-chloroalkyl-aldehydes (IX); these serve for the preparation of the aldehydes (V), as explained above.

Amongst the multiplicity of aldehydes (IX) which can be prepared and can be used for the reaction with phenols (VIII), a few may be mentioned as examples: N-β-chloroethyl-N-methyl-4-aminobenzaldehyde, N-β-chloroethyl-N-ethyl-4-aminobenzaldehyde, N-β-chloropropyl-N-ethyl-4-aminobenzaldehyde, N-β-chloropropyl-N-ethyl-4-aminobenzaldehyde, N-β-chloro-β-phenylethyl-N-methyl-m-toluidin-4-aldehyde, N-β-chloroethyl-N-benzyl-m-toluidin-4-aldehyde, N-β-chloroethyl-N-β-phenylpropyl-m-toluidin-4-aldehyde, N-β-chloro-β-phenoxypropyl-N-ethyl-m-toluidin-4-aldehyde, N-β-chloroethyl-N-β-phenylpropyl-2-chloro-4-aminobenzaldehyde, N-β-chloroethyl-N-methyl-2,5-dimethoxy-4-aminobenzaldehyde, N-δ-bromobutyl-N-methyl-4-aminobenzaldehyde, N-β-chloroethyl-6-formyl-2-methyl-, N-β-chloroethyl-6-formyl-2,7-dimethyl-, N-β-chloroethyl-6-formyl-2,2,4-trimethyl-, N-β-chloroethyl-6-formyl-2-methyl-7-methoxy-, N-β-chloroethyl-6-formyl-2,2,4-trimethyl-7-chloro-, N-β-chloroethyl-6-formyl-2,2,4,7-tetramethyl-, N-β-chloropropyl-6-formyl-2,2,4,7-tetramethyl-, N-γ-chloropropyl-2,2,4-trimethyl-, N-β-chloroethyl-6-formyl-2-ethyl-7-methyl and N-β-chloroethyl-6-formyl-2,2,4-trimethyl-7-trifluoromethyl-1,2,3,4-tetrahydroquinoline, N-β-chloroethyl-7-formyl-3,6-dimethyl-, N-β-chloroethyl-7-formyl-2,3,6-trimethyl-, N-β-chloroethyl-7-formyl-3-methyl-6-chloro-, N-γ-chloropropyl-7-formyl-2,3,6-trimethyl and N-β-chloropropyl-7-formyl-3-ethyl-5-methoxy-2,3-dihydrobenzoxazine-(1,4), and N-δ-chlorobutyl-5-formyl-b 2,3,3,-trimethyl-, N-γchloropropyl-5-formyl-2,3,3-trimethyl-, N-β-chloropropyl-5-formyl-2,3,3-trimethyl- and N-β-chloroethyl-5-formyl-2,3,3-trimethyl-2,3-dihydroindole.

Finally, the dyestuffs according to the invention can also be prepared by first condensing the N-halogenoalkylaldehydes (IX) with the methylene-active compounds (VI) to give the N-halogenoalkyl-styryl dyestuffs (XII) and reacting these in a manner which is in itself known with phenols (VIII), according to the following equation:

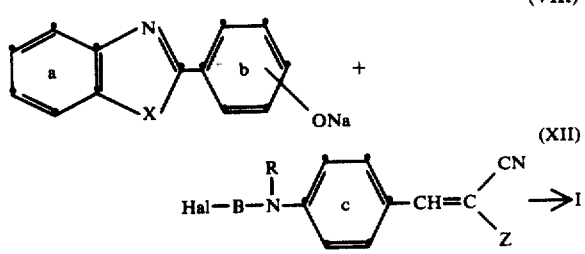

The dyestuffs according to the invention are outstandingly suitable for dyeing and printing hydrophobic fibre materials, especially of polyesters, for example those obtained from terephthalic acid and ethylene glycol or 1,4-bis-(hydroxymethyl)-cyclohexane, of polycarbonates, for example those obtained from α,α-dimethyl-4,4'-dihydroxydiphenylmethane and phosgene, of esters of cellulose, for example cellulose triacetate, and of fibres based on polyvinyl chloride.

The dyestuffs are used in accordance with the known dyeing processes, for example in the exhaustion process as aqueous dispersions in the presence of customary dispersing agents and, if appropriate, customary swelling agents (carriers) at temperatures near 100° C or without carriers at 120° to 140° C (HT process). They are furthermore outstandingly suitable for dyeing in accordance with the known thermosol process. They do not dye, or only dye slightly, wool and cotton simultaneously present in the dye bath, so that they lend themselves well to dyeing polyester/wool and polyester/cellulose fibre mixed fabrics. They have excellent solubility in numerous organic solvents and can be used for dyeing lacquers, oils and plastics, such as polystyrene and polyethylene, in bulk and for dyeing fibres in accordance with the customary spin-dyeing processes.

The dyestuffs according to the invention impart clear, yellow dyeings, of very good fastness to light and good fastness to washing and sublimation, to the hydrophobic materials mentioned. They can be used for combination dyeing with blue azo and anthraquinone disperse dyestuffs and in that case give green dyeings of good fastness to light, which do not show any "catalytic fading", on cellulose triacetate and on polyesters.

The good stability in the dye bath, and to boiling, of the dyestuffs according to the invention in neutral to moderately basic liquors or printing pastes (pH stability up to about pH 10) should be singled out particularly; as a result, the dyestuffs are also very suitable for one-bath dyeing (thermosol-thermofixing process) and printing of polyester/cotton mixed fabrics in combination with reactive dyestuffs which demand the presence of alkali (sodium carbonate or sodium bicarbonate).

In the examples which follow parts denote parts by weight unless expressly stated otherwise. They bear the same ratio to parts by volume (parts by vol.) as that of the gram of the millilitre. The temperatures quoted are to be understood as degrees centigrade.

EXAMPLE 1 a. 22 parts of the base of the formula

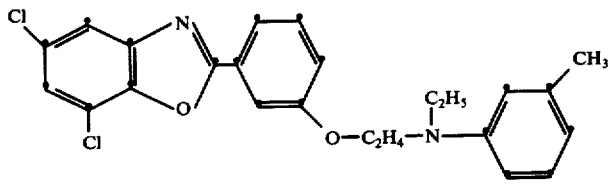

are dissolved in 33 parts of dimethylformamide at 40° to 50° and slowly treated dropwise, at this temperature, with 9 parts of phosphorus oxychloride. The mixture is then stirred for 20 hours at 50°, 40 parts by volume of methanol are added dropwise whilst cooling, thereafter about 20 parts by volume of concentrated aqueous ammonia are added dropwise, whilst cooling, until the pH is 8 to 9, and the aldehyde which has separated out, of the formula

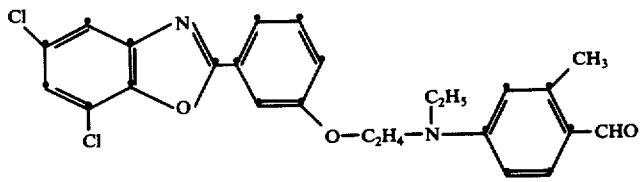

is filtered off, washed with water and dried. 21 parts are obtained, which are employed, without purification, for the synthesis of dyestuffs by heating, in 80 parts by volume of dimethylformamide, with 3.6 parts of malodinitrile and 0.1 part of piperidine for 2 hours to 75°, to bring about condensation. After cooling, 200 parts by volume of ethanol are added and the dyestuff which has separated out is filtered off, washed well with ethanol and with water and dried in vacuo at 80°. The yield is 20.5 parts of a yellow crystal powder of melting point 176° to 177.5°, which after recrystallisation from toluene with added fuller's earth rises to 179° - 180°. The following structure of the dyestuff

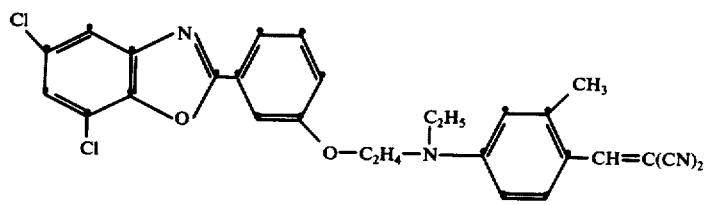

is confirmed by analysis and mass spectrometry (molecular weight calculated and found: 517).

The dyestuff dyes polyester fibres and cellulose triacetate fibres, in accordance with the processes customary for disperse dyestuffs, in brilliant greenish-tinged yellow shades of very good fastness to light, wet processing and especially sublimation, and good general fastness properties, and shows a comparatively outstanding resistance to boiling in dye baths of neutral to moderately alkaline pH value (9 - 10).

b. The base employed as the starting material in this example is prepared by adding 30.8 parts of 2-(3'-hydroxyphenyl)-5,7-dichlorobenzoxazole and 19.8 parts of N-β-chloroethyl-N-ethyl-m-toluidine to a solution of 2.3 parts of sodium in 160 parts by volume of ethanol, heating the mixture for 6 hours to the reflux temperature, filtering off the colourless reaction product after the mixture has cooled, washing it with a little methanol and then with water and drying it at 50° in vauco. Yield: 39.4 parts, of melting point 89° to 91°. The base is converted further without special purification.

c. The 3-benzoxazolyl-phenol employed under b) can be prepared as follows:

178 parts of 45% strength sodium hydroxide solution are added dropwise to a suspension of 460 parts of 93% strength 4,6-dichloro-2-aminophenol hydrochloride in 1,500 parts by volume of dichlorobenzene mixture at 110° to 120°, under a nitrogen atmosphere, 30 parts of boric acid and 276 parts of 3-hydroxy-benzoic acid are added to the resulting clear solution and the water is removed from the system by means of a water separator (about 10 hours). The hot reaction solution is then poured into about 2,500 parts by volume of n-butanol, the hot solution is clarified with fuller's earth and after cooling and, if necessary, further concentrating, about 280 to 290 parts of 2-(3'-hydroxyphenyl) 5,7-dichlorobenzoxazole are obtained, which can be purified further by recrystallisation from chlorobenzene (melting point 233° to 234°). Molecular weight, calculated and confirmed by mass spectrometry at m/e = 280.

EXAMPLE 2

19.3 parts of base of the formula

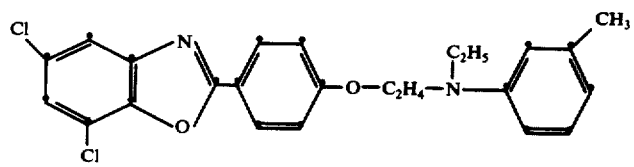

are formylated analogously to Example 1 with 33 parts of dimethylformamide and 9 parts of phosphorus oxychloride by the Vilsmeier method and the aldehyde, isolated in high yield, is reacted, without intermediate purification, with 3.6 parts of malodinitrile in 80 parts by volume of dimethylformamide, in the presence of 0.1 part of piperidine, to give the dyestuff of the formula

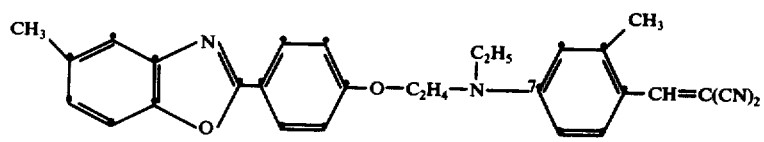

The yield is 18.5 parts of a yellow crystalline powder of melting point 177° to 178.5°, which rises to 178° - 179° on recrystallisation from toluene/fuller's earth.

The dyestuff dyes polyester fibres and cellulose triacetate fibres, in accordance with the processes customary for disperse dyestuffs, in brilliant greenish-tinged yellow shades of good fastness to light, to wet processing and especially to sublimation, and good general fastness properties, and shows comparatively outstanding resistance to boiling in dye baths of neutral to moderately alkaline pH value (9 - 10).

2-(4'-Hydroxyphenyl)-5-methyl-benzoxazole required for the synthesis of the dyestuff, is obtained analogously to section c) of Example 1 by removing the water of reaction from a mixture of 246 parts of 3-amino-4-hydroxy-toluene, 176 parts of 4-hydroxybenzoic acid, 20 parts of boric acid and 1,500 parts by volume of dichlorobenzene over the course of about 9 hours under a N₂ atmosphere, causing the product to crystallise by pouring into butanol, clarifying with fuller's earth and, if necessary, concentrating the solution, and optionally further purifying the product by recrystallisation from n-butanol. Yield about 360 parts. Melting point of the pure product 276° to 278°.

From this product, the base used as the starting material in the present example is prepared analogously to section b) of Example 1 by heating 24.7 parts of 2-(4'-hydroxyphenyl)-5-methyl-benzoxazole and 19.8 parts of N-β-chloroethyl-N-ethyl-m-toluidine in a solution of 2.3 parts of sodium in 160 parts by volume of ethanol to the reflux temperature for 6 hours. After cooling, the product which has crystallised out is filtered off and wahsed with a little methanol and with water, and after drying 34.5 parts of N-ethyl-N-β-[4′-(5″-methyl-benzoxazol-2″-yl)-phenoxy]-ethyl-m-toluidine of melting point 99° to 100° are obtained. The structure is confirmed by analysis and mass spectrometry (m/e found = 386, molecular weight calculated = 386.5).

If the aldehyde reacted with malodinitrile in Example 2 to give the dyestuff is instead condensed, under the same conditions, with equivalent amounts of cyanoacetic acid esters NC—CH$_2$—Z, further valuable styryl dyestuffs with comparable tinctorial properties to those of the malodinitrile dyestuff are obtained. Their colour shades on polyester fibres are less greenish-tinged yellow and are indicated, for some examples, in the table which follows:

out in a crystalline form by adding 250 parts by volume of methanol. It is isolated by filtering off, washing with methanol and water and drying at 80° in vacuo. Yield: 16.5 parts of an orange crystalline powder of melting point 159° to 163°, which can be purified further by recrystallisation from toluene. Molecular weight, calculated and found by mass spectrometry: 478.

The dyestuff has the formula

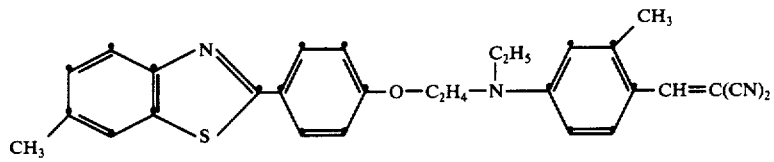

and dyes polyester fibres and cellulose triacetate fibres in greenish-tinged yllow shades of good general fastness properties coupled with good fastness to sublimation, and is distinguished by comparatively outstanding resistance to boiling in neutral to moderately basic dye baths (pH 9 to 10).

To prepare the aldehyde starting material, the base of the formula

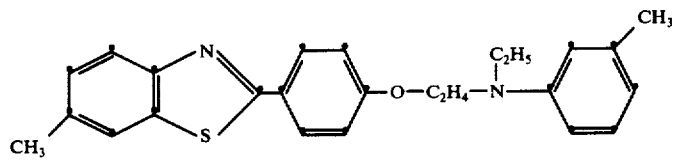

is prepared by boiling 13.3 parts of 2-(4′-hydroxyphenyl)-6-methyl-benzthiazole (readily accessible by converting "dehydrothio-p-toluidine" into its phenol) and 10 parts of N-ethyl-N-β-chloroethyl-m-toluidine in Table 1
(Methine dyestuffs)

| Example No. | Z | Colour shade on polyester |
|---|---|---|
| 3 | COOCH$_3$ | strongly greenish-tinged yellow |
| 4 | COOC$_2$H$_5$ | strongly greenish-tinged yellow |
| 5 | COOC$_3$H$_{7(n)}$ | strongly greenish-tinged yellow |
| 6 | COOC$_4$H$_{9(n)}$ | strongly greenish-tinged yellow |
| 7 | COOC$_2$H$_4$CN | strongly greenish-tinged yellow |
| 8 | COOCH$_2$—C$_6$H$_4$—Cl | strongly greenish-tinged yellow |
| 9 | COOC$_2$H$_4$C$_6$H$_5$ | strongly greenish-tinged yellow |
| 10 | COO—C$_6$H$_{11}$ | strongly greenish-tinged yellow |

EXAMPLE 11

17.9 parts of the crude aldehyde of the formula

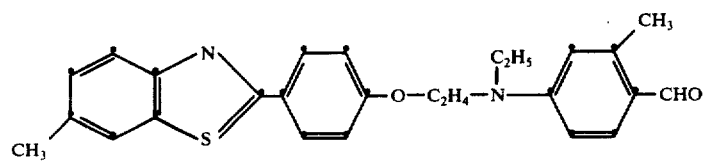

in 70 parts by volume of dimethylformamide are condensed with 3.6 parts of malodinitrile, with addition of 0.1 part of piperidine, for 2 hours at 50° to 60°, and after the reaction mixture has cooled the dyestuff is separated a solution of 1.27 parts of sodium in 80 parts by volume of ethanol for 6 hours under reflux, analogously to Example 1 (yield: 18.8 parts of crude melting point 99° to 103°), and the total amount is reacted, analogously to Example 1, with 33 parts of dimethylformamide and 19.2 parts of phosphorus oxychloride at 50° to 60° for 15 hours, by the Vilsmeir method, to give the aldehyde. Yield: 17.9 parts of melting point 108° to 110° (crude).

Starting from 2-(4'-amino-3'-methyl)-4,6-dimethylbenzthiazole ("dehydro-thio-m-xylidene") and related 4'- amino compounds of this type, it is possible to obtain By appropriate variation of the benzazolylphenol starting component and of the optionally cyclised N-halogenoalkylaniline starting component and of the cyanoacetic acid derivatives it proves possible to synthesise a large number of valuable styryl dyestuffs which are distinguished by similar tinctorial properties and resistance to boiling as the dyestuffs described in the preceding examples.

By way of illustration, some examples of such dyestuffs, which dye polyester fibres in greenish-tinged yellow shades, are listed in the table which follows.

Table 2

Methine dyestuffs of the formula

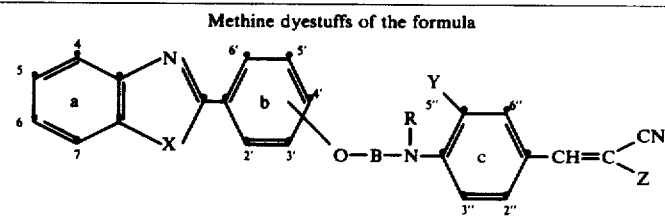

| Example No. | Substituents in a, b and c | X | Link of —O—B— to the ring b | B | R or R + Y | Z |
|---|---|---|---|---|---|---|
| 12 | 4,6,3',2"-tetra-CH$_3$ | S | 4' | C$_2$H$_4$ | C$_2$H$_5$ | CN |
| 13 | 6,2"-di-CH$_3$ | S | 4' | —CH(CH$_3$)CH$_2$— | C$_2$H$_5$ | CN |
| 14 | 6,2"-di-CH$_3$ | S | 4' | C$_2$H$_4$ | —CH(CH$_3$)—(CH$_2$)$_2$— | CN |
| 15 | 6,2"-di-CH$_3$ | S | 4' | C$_2$H$_4$ | —CH(CH$_3$)—CH$_2$—O— | CN |
| 16 | 6-CH$_3$-2"-Cl | S | 4' | C$_2$H$_4$ | CH$_3$ | CN |
| 17 | 6-CH$_3$ | S | 4' | C$_2$H$_4$ | C$_4$H$_{9(n)}$ | CN |
| 18 | 6-Cl-2"-CH$_3$ | S | 4' | C$_2$H$_4$ | C$_2$H$_5$ | CN |
| 19 | 6-Cl-2"-CH$_3$ | S | 3' | C$_2$H$_4$ | C$_2$H$_5$ | CN |
| 20 | — | O | 4' | C$_2$H$_4$ | C$_3$H$_{7(n)}$ | CN |
| 21 | — | O | 3' | C$_2$H$_4$ | CH$_3$ | COOC$_2$H$_4$C$_6$H$_5$ |
| 22 | 2"-CH$_3$ | O | 4' | C$_2$H$_4$ | C$_2$H$_5$ | CN |
| 23 | 2"-CH$_3$ | O | 3' | C$_2$H$_4$ | C$_2$H$_5$ | CN |
| 24 | 5-Cyclohexyl-2"-CH$_3$ | O | 3' | C$_2$H$_4$ | C$_2$H$_5$ | CN |
| 25 | 5-Cyclohexyl-2"-CH$_3$ | O | 4' | C$_2$H$_4$ | CH$_3$ | CN |
| 26 | 5-Cyclohexyl | O | 3' | C$_2$H$_4$ | C$_2$H$_5$ | CN |
| 27 | 5-t-C$_4$H$_9$-2"-CH$_3$ | O | 3' | C$_2$H$_4$ | CH$_3$ | CN |
| 28 | 5,2"-di-CH$_3$ | O | 3' | C$_2$H$_4$ | C$_2$H$_5$ | CN |
| 29 | 5,2"-di-CH$_3$ | O | 3' | —CH—CH$_2$—<br>    |<br>   C$_6$H$_5$ | CH$_3$ | CN |
| 30 | 5,2"-di-CH$_3$ | O | 2' | C$_2$H$_4$ | C$_2$H$_5$ | CN |
| 31 | — | O | 4' | C$_2$H$_4$ | —C(CH$_3$)$_2$—CH$_2$—CH(CH$_3$)— | CN |
| 32 | 2"-CH$_3$ | O | 4' | C$_2$H$_4$ | —C(CH$_3$)$_2$—CH$_2$—CH(CH$_3$)— | CN |
| 33 | 2"-CH$_3$ | O | 3' | C$_2$H$_4$ | —CH(CH$_3$)—CH$_2$—O— | CN |
| 34 | 5,2"-di-CH$_3$ | O | 3' | C$_2$H$_4$ | —C(CH$_3$)$_2$—CH$_2$—CH(CH$_3$)— | CN |
| 35 | 5-CH$_3$ | O | 4' | C$_2$H$_4$ | —CH(CH$_3$)—C(CH$_3$)$_2$— | CN |
| 36 | 5-Cl-2"-CH$_3$ | O | 3' | C$_2$H$_4$ | —CH(CH$_3$)—C(CH$_3$)$_2$— | CN |
| 37 | 5-CH$_3$-2"-OCH$_3$ | O | 3' | C$_2$H$_4$ | CH$_3$ | CN |
| 38 | 5-Cl-2",5"-di-OCH$_3$ | O | 3' | C$_2$H$_4$ | CH$_3$ | CN |
| 39 | 5,2"-di-CH$_3$ | O | 4' | (CH$_2$)$_3$ | C$_2$H$_5$ | CN |
| 40 | 5-OC$_2$H$_5$-2"-CH$_3$ | O | 4' | C$_2$H$_4$ | C$_2$H$_5$ | CN |
| 41 | 5,2"-di-CH$_3$ | O | 3' | (CH$_2$)$_4$ | C$_2$H$_5$ | CN |
| 42 | 5,2"-di-CH$_3$ | O | 3' | (CH$_2$)$_4$ | C$_2$H$_5$ | COOC$_2$H$_5$ |
| 43 | 5-CH$_3$ | O | 3' | —CH—CH$_2$—<br>    |<br> CH$_2$OC$_2$H$_5$ | C$_2$H$_5$ | CN |
| 44 | 5-Cl-2"-CH$_3$ | O | 3' | C$_2$H$_4$ | CH$_3$ | CN |
| 45 | 5-Cl-2"-CH$_3$ | O | 4' | C$_2$H$_4$ | C$_2$H$_5$ | CN |
| 46 | 5-Cl-2"-CH$_3$ | O | 3' | C$_2$H$_4$ | C$_2$H$_5$ | CN |
| 47 | 5-C$_6$H$_5$-2"-CH$_3$ | O | 3' | C$_2$H$_4$ | C$_2$H$_5$ | CN | further 4'-hydroxy precursors for dyestuffs according to the invention.

EXAMPLE 48

1 part of the dyestuff according to Example 1 of the formula

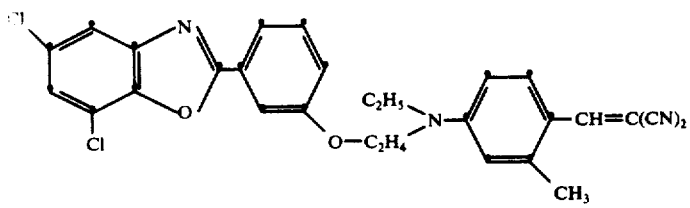

is dissolved in 25 g of dimethylformamide, 1 part of a dispersing agent (alkylaryl polyglycol ether) is added and a fine dispersion is prepared by stirring the mixture into 4,000 parts by volume of water. 20 g of a carrier (cresotin acid ester) and 4 g of monosodium dihydrogen phosphate are further added to this dispersion and the pH value of the dye bath is adjusted to 4.5 - 5 with acetic acid. 100 parts of previously cleaned polyester material (polyethylene glycol terephthalate of the Dacron type, of Messrs. Du Pont) are introduced into this dye bath at 40° to 50°, the temperature is raised to 80° - 85° over the course of 15 to 20 minutes and is kept thereat for 20 minutes, and the bath is then gradually brought to the boil. After boiling for 1 to 1.5 hours the dyeing process has finished. The dyed material is rinsed hot once, then rinsed cold and dried. It exhibits a clear, greenish-tinged yellow dyeing of very good fastness to light, washing and sublimation.

The dyestuff can also be used as a conditioned powder by grinding it as an aqueous paste with a dispersing agent (for example ligninsulphonate) and then drying it.

If the co-use of a carrier is dispensed with, a comparable dyeing is obtained if the high temperature dyeing process (HT process) is used, with a liquor ratio of 1 : 20. Again, the previously cleaned polyester material is introduced, at 40° to 50°, into the dye bath which in other respects has been prepared in the same way, the bath temperature is raised to 125° over the course of 30 to 40 minutes and dyeing is carried out at this temperature for 1 to 1.5 hours.

EXAMPLE 49

100 parts of a cellulose triacetate rayon fabric are dyed for 1 hour at the boil in a dye bath prepared from 1.5 parts of the dyestuff according to Example 28, 4 parts of Marseilles soap and 4,000 parts of water. The resulting greenish-tinged yellow dyeing has very good fastness properties.

EXAMPLE 50

1,000 parts of polystyrene are mixed with 6 parts of the dyestuff according to Example 47 and the mixture is fused in the usual manner at about 200° under a nitrogen atmosphere. The greenish-tinged yellow injection mouldings obtained from this material exhibit good colour fastness properties.

I claim:

1. Water-insoluble styryl dyestuffs of the formula

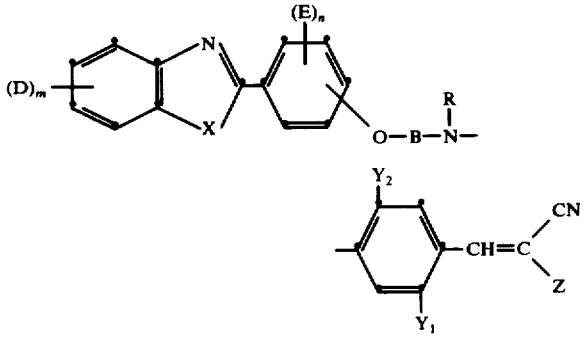

wherein

D and E, independently of one another, are $C_1$-$C_4$-alkyl, $C_1$-$C_4$-alkoxy, trifluoromethyl, chlorine or bromine, and D additionally is phenyl, benzyl, cyclopentyl or cyclohexyl; provided that when more than one substituent on the same nucleus is tetrabutyl or trifluoromethyl they are on nonadjacent carbon atoms;

m and n, independently of one another, are numbers 0 to 4;

B is $C_2H_4$, —CH(CH$_3$)CH$_2$—, —CH(CH$_2$OCH$_3$)CH$_2$—, or —CH(C$_6$H$_5$)CH$_2$—;

R is hydrogen, $C_1$-$C_4$-alkyl, or $C_1$-$C_4$-alkyl substituted by ethoxy, methoxy, cyano, or phenyl;

$Y_1$ is hydrogen, $C_1$-$C_4$-alkyl, trifluoromethyl, $C_1$-$C_4$-alkoxy, or chlorine;

$Y_2$ is hydrogen, $C_1$-$C_4$-alkyl, $C_1$-$C_4$-alkoxy, or chlorine;

x is —O—; and

Z is cyano or COOR, where $R_1$ is $C_1$-$C_4$-alkyl or $C_1$-$C_4$-alkyl substituted by methoxy, ethoxy, chlorine, cyano, or phenyl.

2. Water-insoluble styryl dyestuffs according to claim 1, of the formula

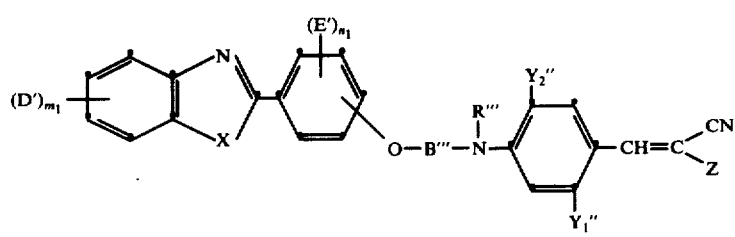

wherein

X and Z have the meaning indicated in claim 1 and

D ' denotes chlorine, methyl, ethyl, propyl, methoxy, ethoxy, phenyl, benzyl or cyclohexyl, E' denotes chlorine, methyl, ethyl, propyl, methoxy or ethoxy, $m_1$ and $n_1$ each denote 0 to 2, B''' denotes —C$_2$H$_4$— or —CH(CH$_3$)CH$_2$—,
Y$_1$'' denotes hydrogen, methyl, ethyl, methoxy, ethoxy or chlorine,
Y$_2$'' denotes hydrogen, methyl, methoxy or ethoxy, and
R''' denotes hydrogen, methyl or ethyl.
3. Styryl dyestuff according to claim 1 of the formula
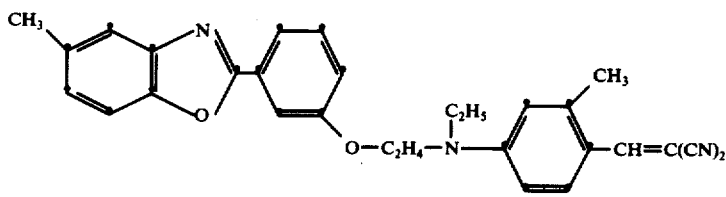
4. Styryl dyestuff according to claim 1 of the formula
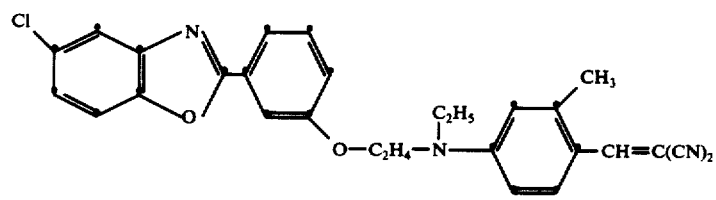
* * * * *